United States Patent [19]
Kraus

[11] 3,910,650
[45] Oct. 7, 1975

[54] HYDROSTATIC AXIAL THRUST BEARING
[75] Inventor: Charles Edward Kraus, Austin, Tex.
[73] Assignee: Excelermatic, Inc., Leesburg, Va.
[22] Filed: Oct. 7, 1974
[21] Appl. No.: 512,512

[52] U.S. Cl. .................. 308/9; 308/122; 308/219
[51] Int. Cl.² ................................. F16C 17/16
[58] Field of Search ........ 308/9, 35, 36.3, 122, 160, 308/174, 219, 226, 232, 233, 234

[56] References Cited
UNITED STATES PATENTS
3,499,692  3/1970  Kaiser .................................. 308/9
3,752,542  8/1973  Kraus .................................. 308/9

Primary Examiner—Robert S. Ward, Jr.
Assistant Examiner—Gene A. Church

[57] ABSTRACT

A hydrostatic axial thrust bearing has a load member supported on a support member by pressurized fluid supplied to a cavity formed between the two members and an antifriction bearing so supported in the cavity that it carries the load member when sufficiently pressurized fluid is not supplied to the cavity and that the load member and the antifriction bearing are moved away from each other when the fluid supplied to the cavity is sufficiently pressurized to carry the load member.

9 Claims, 3 Drawing Figures ial thrust bearing which includes an antifriction bearing for supporting the bearing load when the fluid in the bearing is not sufficiently pressurized to carry the load.

HYDROSTATIC AXIAL THRUST BEARING

BACKGROUND OF THE INVENTION

1. Field of the Invention

The present invention relates to a hydrostatic axial thrust bearing which includes an antifriction bearing for supporting the bearing load when the fluid in the bearing is not sufficiently pressurized to carry the load.

2. Description of the Prior Art

A hydrostatic axial thrust bearing consists of a support member and a load member disposed adjacent the support member with a cavity between the two members to which cavity pressurized fluid is supplied for supporting the load member on the support member. The pressurized fluid is normally supplied by a pump associated with the load member so that, at low rotational speeds of the load member, only relatively little pressurized fluid is supplied to the cavity between the two members, in fact, the pressurized fluid supply may be so small that the load member is not properly lifted off the support member.

It has been tried to include in the bearing design roller or ball bearings on which the load member seats when not lifted by the hydraulic fluid but it has been found that such antifriction bearings remain in operation even after pressure build-up in the cavity because the bearings are always in close proximity with the surfaces of the support and load members to be effective during a loss of fluid pressure. This, of course, adds to the losses occurring in the pressurized fluid between the support and load members during high speed operation.

SUMMARY OF THE INVENTION

In a hydrostatic axial thrust bearing having a load member supported on a support member by a pressurized fluid supplied to a cavity formed between the two members an antifriction bearing is so arranged between the support and load members that the load which is taken up by the antifriction bearing when sufficiently pressurized fluid is not present in the cavity is transferred to the hydrostatic fluid and the antifriction bearing is spaced from the load when the hydrostatic fluid supplied to the cavity is sufficiently pressurized to support the load.

DESCRIPTION OF THE PREFERRED EMBODIMENT

Figure 1:
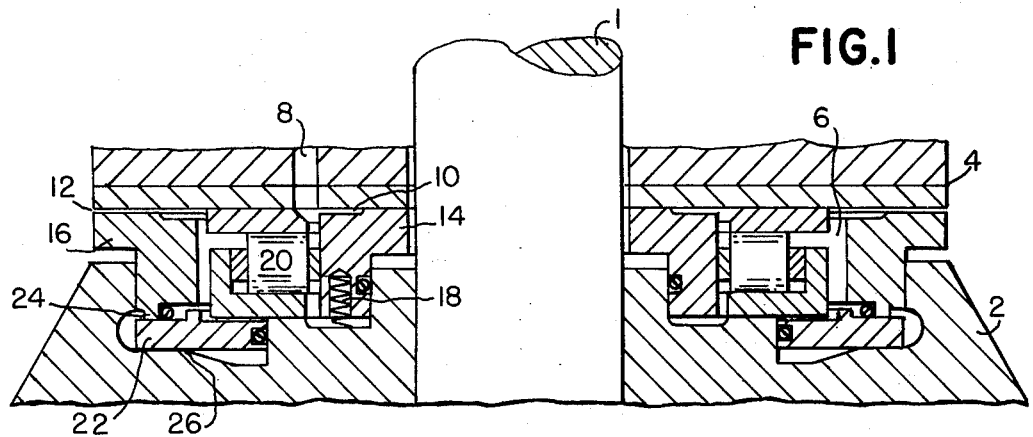
FIGS. 1 and 2 each show a hydrostatic axial thrust bearing including an antifriction bearing for taking up the bearing load when sufficiently pressurized hydrostatic fluid is not present in the bearing, and wherein the load is taken off the antifriction bearing when the pressure of the pressurized fluid in the bearing is sufficiently high to support the load.

FIG. 1 shows a hydrostatic thrust bearing in which a support member 2 supports a load member 4 by a hydrostatic bearing structure disposed between the support and the load members. The support member 2 may be mounted on a shaft 1. It has a cavity 6 formed therein into which pressurized fluid is admitted through a pressurized fluid passage 8. The pressurized fluid supports the load member 4 on the support member 2. Escape of pressurized fluid from the cavity 6 is permitted only through passages 10 and 12 formed between the surfaces of the load member and the seal rings 14 and 16 movably disposed in, and sealed against the walls of, the cavity 6. One of the seal rings, for example seal ring 14, may be biased by springs 18 toward the load member 4. The seal ring 14 is so sized that, when the cavity 6 is pressurized, its distance from the load member is automatically adjusted to provide only a small gap for a small leakage flow.

To avoid frictional contact between the support and the load members when no or little pressurized fluid is supplied to the cavity 6, a roller bearing 20 is arranged in the cavity 6 between the support and load members which roller bearing 20 can carry the load of the load member 4 on the support member 2.

The seal ring 16 is supported in the cavity 6 by a spring ring 22 which is supported by the support member 2 near its radially outer end and which sealingly engages the cavity walls at its radially inner end. The inner end is free to be resiliently forced toward the load cavity walls by the pressurized fluid in the cavity 6. A support fulcrum 24 for the seal ring 16 on the spring ring 22 is arranged at the radially outer end of the spring ring 22, whereas the fulcrum 26 for the support of the spring ring 22 on the support member 2 is formed radially inwardly of the fulcrum 24 so that the radial outer end of the spring ring 22 and the seal ring 16 supported thereon are moved toward the load member when the radially inner area of the spring ring is deflected toward the support member 2 by pressurized fluid in the cavity 6.

Therefore, without pressurized fluid being present in the cavity 6, the load member 4 will be supported solely by the roller bearing 20 without coming into contact with the seal ring 16. When the pressure of the fluid admitted to the cavity 6 becomes sufficient to deflect the radially inner portion of the spring ring 22, the outer end thereof and, together therewith, the seal ring 16 are moved toward the load member 4. This causes lift off of the load member 4 off the roller bearing such that the load member will then be supported solely by the pressurized fluid in the cavity 6. The inner seal ring 14 which is a limited leakage type seal ring follows the movement of the outer seal ring 16 as the inner seal ring 14 remains at a predetermined distance from the load member 4.

Figure 2:
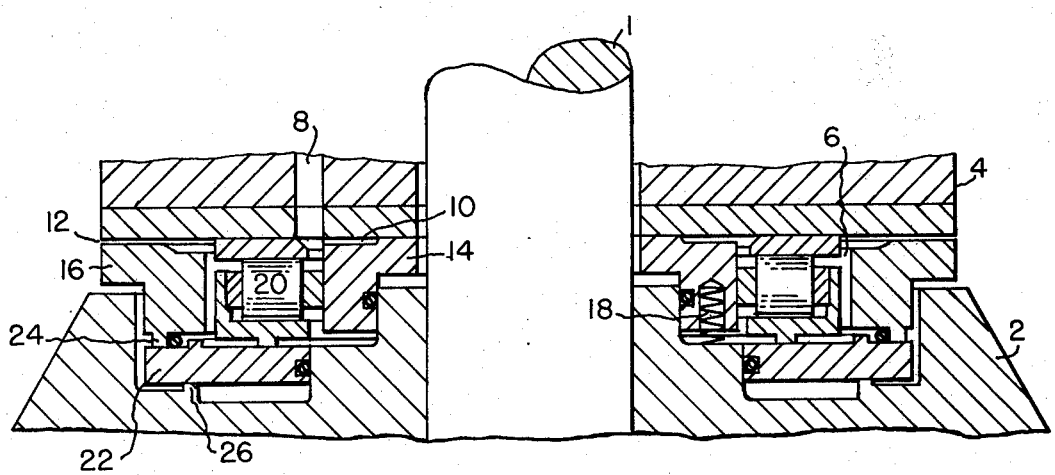

FIG. 2 shows an arrangement similar to FIG. 1 so that the same reference numerals are used to indicate similar parts. However, a full description is not necessary. In the arrangement of FIG. 2 the bearing 20 is not directly supported on the support member 2 but on the radially inner portion of the spring 22 which portion moves away from the support member 2 when the pressure of the fluid in the cavity 6 increases. This not only lifts the load member 4 off the roller bearing 20 but also lowers the bearing 20 so that the clearance between the bearing 20 and the load member 4 becomes even larger than obtainable with the arrangement of FIG. 1.

Figure 3:
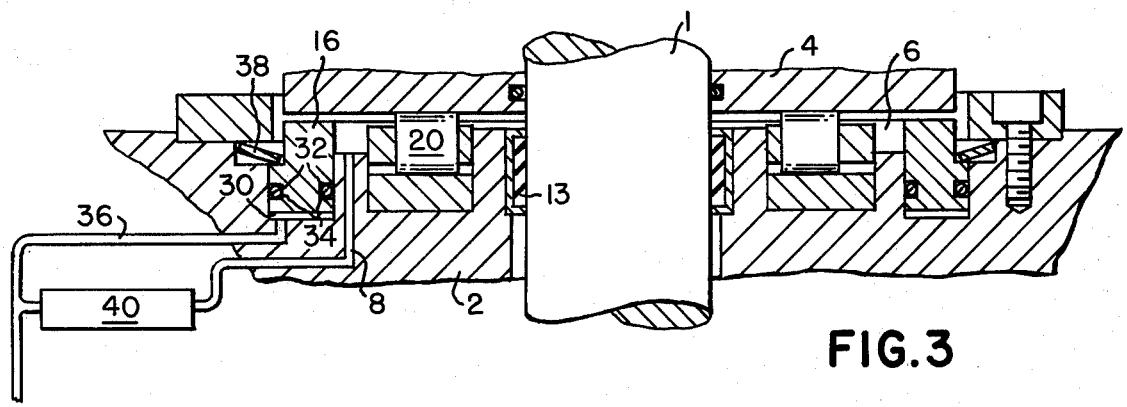
FIG. 3 shows an embodiment in which the load is transferred to the antifriction bearing before the fluid pressure reaches non-supporting values.

In the embodiments shown in FIGS. 1, 2 and 3 the fluid pressure inside the bearing determines when the antifriction bearing is placed into operation to support the load.

In many cases, however, it is advisable to bring the antifriction bearing into action before the fluid pressure in the cavity 6 drops below a critical value to avoid any contact of the load 4 with the seal ring 16.

With the embodiment of FIG. 3 therefore it is made sure that the seal ring is retracted before the fluid pressure in the bearing cavity has fallen to a degree at which the fluid can no longer support the load. As shown in FIG. 3, the load member 4 is associated with the shaft 1 and supported by the support member 2 which has a cavity 6 formed therein to which pressurized fluid is admitted through pressurized fluid passage 8. The shaft 1 which as shown is rotatable with the load 4 extends through an opening in the support member 2 and is sealed by sealing means 13. Again a seal ring 16 and a bearing 20 are disposed in the cavity 6 wherein the seal ring 16 limits escape of pressurized fluid from the cavity and the bearing 20 carries the load of the load member 4 when sufficiently pressurized fluid is not supplied. In this case, however, the seal ring 16 is movably disposed in an annular opening 30 and O-seals 32 are disposed in grooves 34 so that the seal ring forms an annular piston which is movable axially by hydraulic fluid supplied to the annular opening 30 through passage 36. A Belleville spring 38 is disposed around the seal ring 16 and so abuts the seal ring 16 that the seal ring 16 is forced by the spring into its retracted position away from the load member 4 but can be moved toward the load member 4 when sufficiently pressurized fluid is supplied to the cavity 30.

In order to prevent the seal ring 16 from contacting the load member at any time, the spring 38 is so selected that the fluid pressure necessary to move the seal ring against the spring force is greater than the pressure of the fluid in the cavity 6 at which pressure the load 4 is still easily supported by the pressurized fluid. If, for example, pressurized fluid of 50 psi will still support the load member the spring 38 is so selected that the seal ring 16 is retracted when the pressure of the fluid in the cavity 30 falls below 80 psi. Then the seal ring 16 will always be retracted while the pressure in the cavity 6 is still able to support the load member 4 and sufficiently pressurized fluid will be available before the seal ring 16 is moved out of the cavity 30 against the force of spring 38 to cause lifting of the load member off the bearing 20.

In order to prevent unnecessary flow of fluid into the cavity 6 when the load member 4 is supported by the bearing 20 and the seal ring 16 is removed from the load member 4, a flow limiting device 40 is disposed in passage 8 which limits fluid flow and permits passage of fluid only when its pressure is above a certain value, for example 50 psi. Such flow limiting device may be one as known under the name "flow sert".

The invention is, of course, not limited to the arrangements described. It would, for example, be as well possible to firmly position the seal ring 16 or, instead, provide lands integral with the support member 2. Only lowering of the roller bearing 20, as shown in the embodiment of FIG. 2, by pressurized fluid supplied to the cavity 6 or by another pressurized fluid source while retaining the seal ring 16 in its position could also sufficiently space the antifriction bearing 20 from the load 4 to avoid unnecessary friction at high rotational speeds.

What is claimed is:

1. In a hydrostatic axial thrust bearing including: a support member; a rotatable load member disposed opposite said support member, said members having a cavity formed therebetween; means for admitting pressurized fluid to said cavity for supporting said load member on said support member; and an antifriction bearing supported in said cavity by one of said members for supporting the opposite member the improvement comprising: fluid pressure sensitive means associated with said bearing for spacing said opposite member and the antifriction bearing from each other when the fluid in the pressurized fluid admitting means is sufficiently pressurized to insure support of the load member by the support member.

2. A hydrostatic bearing as recited in claim 1, wherein an axially movable seal ring is associated with one of said support and load members to form with the other member a pressurized fluid leakage path around said cavity, said seal ring being supported by means sensitive to the pressure of the fluid available for supply to said cavity and adapted to move said seal ring toward the other member when subjected to said pressurized fluid.

3. A hydrostatic bearing as recited in claim 2, wherein said pressure sensitive means for supporting said seal ring is a spring ring supported in said cavity on an annular fulcrum arranged near one of its radial ends, said spring ring having one side exposed to the pressurized fluid in said cavity so that its other radial end portion is deflected by the pressurized fluid away from the other member while said one radial end of said spring ring is deflected toward the other member, said seal ring being supported by said one radial end of said spring ring.

4. A hydrostatic bearing as recited in claim 3, wherein said antifriction bearing is supported in said cavity by the radially inner end of said spring ring so that the antifriction bearing is moved away from the other member while the associated seal ring is moved toward the other member when the fluid in the cavity is pressurized.

5. A hydrostatic bearing as recited in claim 1, wherein said antifriction bearing is supported in said cavity by a fluid pressure sensitive means adapted to move said antifriction bearing away from said load member when subjected to the pressurized fluid.

6. A hydrostatic bearing as recited in claim 5, wherein said fluid pressure sensitive means is a spring ring supported at one of its radial ends in said cavity by said support member and supporting said antifriction bearing at its other radial end, said spring ring having its bearing supporting surface exposed to the pressurized fluid in the cavity so that it is deflected away from said load member when said cavity is pressurized.

7. A hydrostatic bearing as recited in claim 2, wherein said axially movable seal ring is disposed in an annular groove formed in the one of said support and lead members such that said seal ring forms an annular piston, said annular groove being in communication with said pressurized fluid admitting means for moving said movable seal toward the other of said members.

8. The hydrostatic bearing as recited in claim 7, wherein spring means are provided forcing said movable seal into said annular groove with a predetermined force such that said movable seal is moved into its end position toward the other of said members only while the pressure of the fluid in said fluid admitting means is above a predetermined first value.

9. A hydrostatic bearing as recited in claim 8, wherein said means for admitting pressurized fluid to said cavity includes a flow limiting device which limits the flow, and permits passage of fluid to, said cavity only when the pressure of said pressurized fluid is above a predetermined second value which is lower than said first value.

* * * * *